(12) United States Patent
Ji et al.

(10) Patent No.: US 6,644,621 B2
(45) Date of Patent: Nov. 11, 2003

(54) ANTI-LOCK BRAKE SYSTEM SOLENOID VALVE

(75) Inventors: Su-Hwan Ji, Kyunggi-do (KR); Dong-Ho Ahn, Kyunggi-do (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 0 days.

(21) Appl. No.: 10/322,735

(22) Filed: Dec. 19, 2002

(65) Prior Publication Data

US 2003/0183790 A1 Oct. 2, 2003

(30) Foreign Application Priority Data

Apr. 1, 2002 (KR) ........................................ 2002-17828

(51) Int. Cl.[7] .............................................. F16K 31/06
(52) U.S. Cl. .............................. 251/129.02; 251/129.13; 303/119.2
(58) Field of Search ....................... 251/129.01–129.22; 303/119.1, 119.2

(56) References Cited

U.S. PATENT DOCUMENTS

| | | | | |
|---|---|---|---|---|
| 5,118,076 A | * | 6/1992 | Homes ................... | 251/129.02 |
| 5,441,233 A | * | 8/1995 | Asou et al. ............ | 251/129.15 |
| 5,743,238 A | * | 4/1998 | Shorey et al. .......... | 251/129.16 |
| 5,939,811 A | * | 8/1999 | Enomoto et al. ...... | 251/129.02 |
| 6,065,734 A | * | 5/2000 | Tackett et al. ......... | 251/129.02 |
| 6,113,014 A | * | 9/2000 | Coldren et al. ........ | 251/129.15 |

* cited by examiner

*Primary Examiner*—Paul J. Hirsch
(74) *Attorney, Agent, or Firm*—Greenblum & Bernstein, P.L.C.

(57) ABSTRACT

The present invention relates to an ABS solenoid valve. The ABS solenoid valve comprises: a housing coupled within a modulator block; a receiving unit disposed within the housing; a plunger mounted on the receiving unit and having a projection in one end; a compressive spring coupled with the plunger adjacent to the projection; a valve seat supported by the compressive spring and received within the housing; a coupling channel disposed within the valve seat; an orifice communicating with the coupling channel of the valve seat and coupling with a side of the housing; a flow path disposed within the orifice; a channel pipe communicating with the flow path, a flow groove disposed in an outer periphery of the valve seat; and a discharge port disposed in the housing and the orifice and communicating with the flow groove of the valve seat. The channel grooves are disposed in the outer periphery of the valve seat to simplify a fabricating process. The channel pipe in the orifice is so formed to gradually enlarge in diameter from the flow path side toward the hole side of the valve seat so that smooth flow of brake oil prevents any hydraulic ram thereby enhancing the braking power. The ball is coupled with a blocking portion of the orifice discharge channel to reduce the oil pressure within a wheel cylinder thereby reducing lowering the pressure within the housing. The above improved construction simplifies components of the valve and downsizes the same.

6 Claims, 3 Drawing Sheets

[FIG. 1]
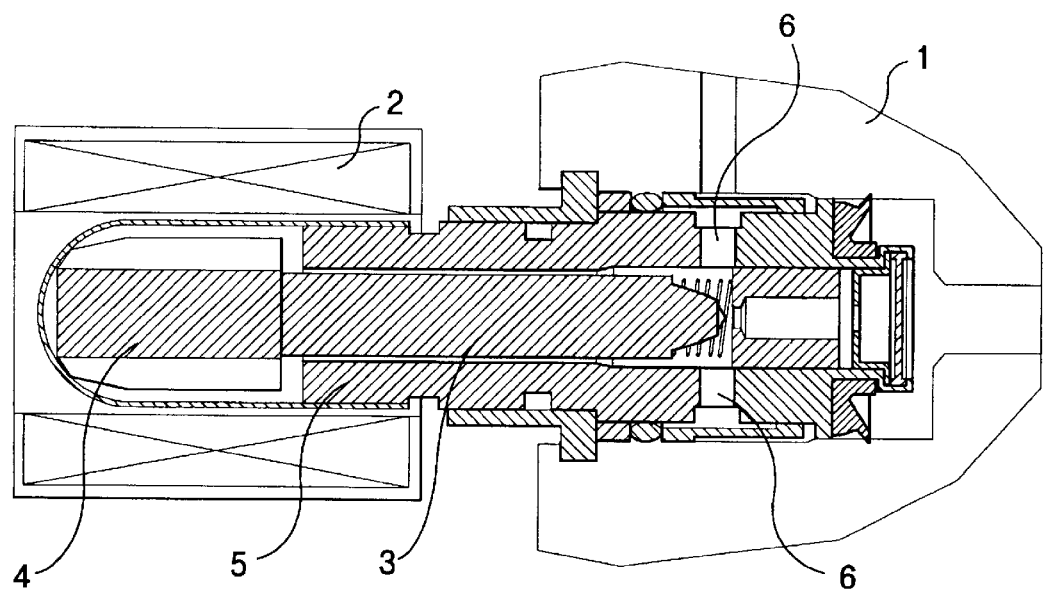

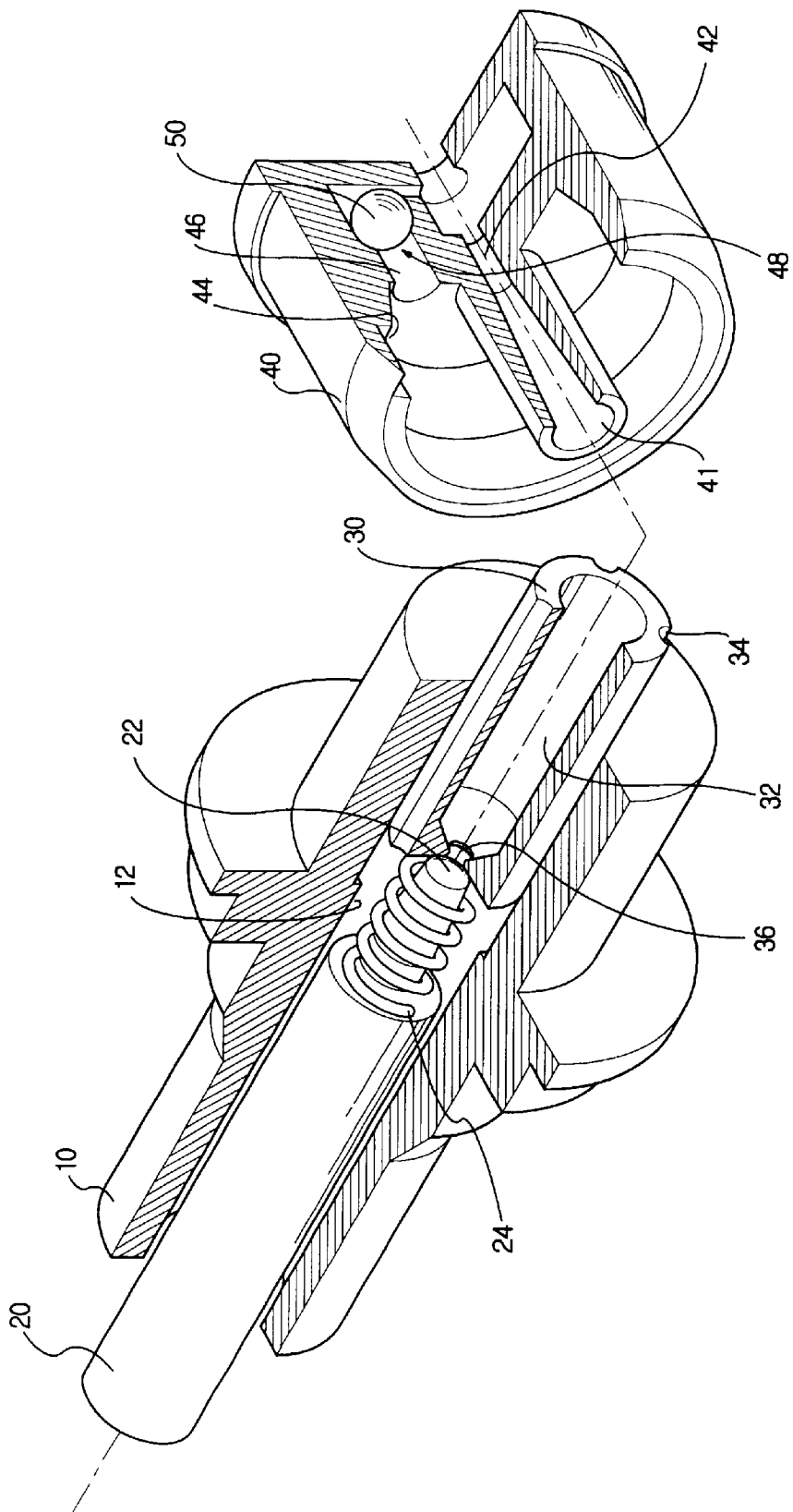
[FIG. 2]

[FIG. 3]
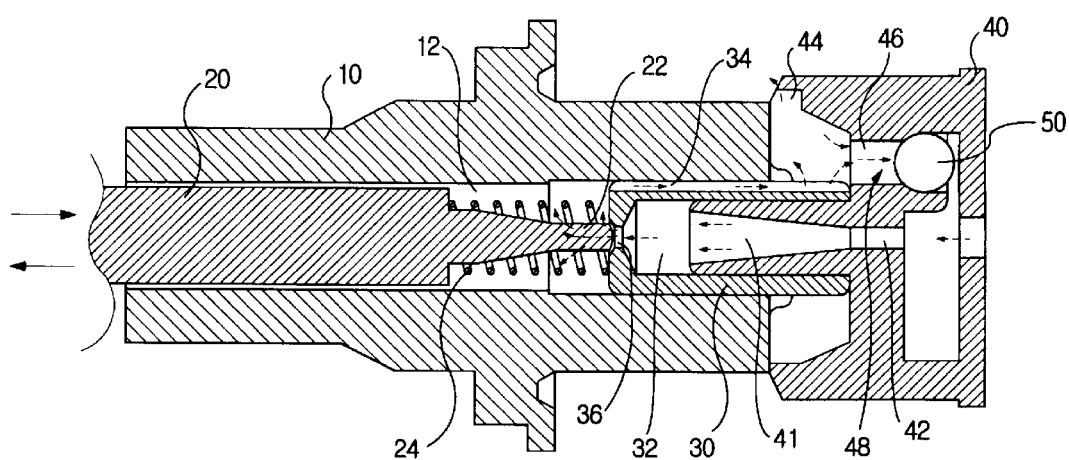

180

ANTI-LOCK BRAKE SYSTEM SOLENOID VALVE

BACKGROUND OF THE INVENTION

1. Field of the Invention

The present invention relates to an Anti-lock Brake System (ABS) solenoid valve. More particularly, the ABS solenoid valve is mounted on a modulator block, which includes a suction unit for feeding from a master cylinder and a discharge unit for discharging into a wheel cylinder, for opening and closing a valve port to impart fluid flow via reciprocating motion of a plunger.

2. Description of the Related Art

Generally in a vehicle mounted with an anti-lock brake system, a solenoid valve has an anti-skid brake system, in which an ECU detects a wheel speed of the vehicle based upon a signal from a wheel speed sensor and sends the signal to an actuator so that the actuator controls brake oil pressure of wheel cylinders in response to the signal according to road conditions so as to prevent locking of the wheels.

That is, the hydraulic control valve is an apparatus for introducing brake oil into a modulator block from a master cylinder to adjust the quantity of brake oil while adjusting the speed of the vehicle. The hydraulic control valve will be described in reference to FIG. 1, in which a solenoid valve is inserted into a modulator block 1, and applying current to a coil 2 generates a magnetic field so that an armature 4 coupled with a plunger 3 is absorbed to a lateral portion of a housing 5 and the plunger 3 shuts a valve port thereby adjusting brake oil.

The conventional ABS solenoid valve of the above construction has a very complicated design, in which a discharge port hole 6 is centrally disposed in a receiving section in the housing 5 so that it was difficult to fabricate the housing 5. Further, this has confronted a problem that braking power is degraded since there is no means for regulating flow rate when introduced oil is flown to a discharge port.

SUMMARY OF THE INVENTION

The present invention has been made to solve the foregoing problems and it is therefore an object of the present invention to provide an ABS solenoid valve which comprises a channel groove in an outer periphery of a valve seat, a discharge port disposed in an end of a housing or a coupling end of the housing and an orifice and for communicating with the channel groove of the valve seat, a discharge channel disposed in the orifice and a ball coupled with a blocking portion of the discharge channel so that the housing is more simply fabricated and manufacturing cost and time are saved to enhance productivity.

According to an aspect of the invention to obtain the above objects, it is provided an ABS solenoid valve for opening and closing a valve port to impart fluid flow via reciprocating motion of a plunger and mounted on a modulator block, which includes a suction unit for feeding from a master cylinder and a discharge unit for discharging into a wheel cylinder, the ABS solenoid valve comprising: a housing coupled within the modulator block; a receiving unit disposed within the housing; the plunger mounted on the receiving unit and having a projection in one end; a compressive spring coupled with the plunger adjacent to the projection; a valve seat supported by the compressive spring and received within the housing; a coupling channel disposed within the valve seat; an orifice communicating with the coupling channel of the valve seat and coupling with a side of the housing; a flow path disposed within the orifice; a channel pipe communicating with the flow path, a flow groove disposed in an outer periphery of the valve seat; and a discharge port disposed in the housing and the orifice and communicating with the flow groove of the valve seat.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a side cross-sectional view of a conventional solenoid valve for braking a vehicle;

FIG. 2 is partially broken perspective view of an ABS solenoid valve of the invention; and FIG. 3 is a side cross-sectional view of the ABS solenoid valve of the invention.

DETAILED DESCRIPTION OF THE PREFERRED EMBODIMENT

The following detailed description will disclose the construction of an ABS solenoid valve of the present invention in reference to FIG. 2 which is a partially broken perspective view of the ABS solenoid valve of the present invention.

A housing 10 coupled to and mounted on a modulator block has a hollow inner space to form a receiving section 12.

A plunger 20 and a valve seat 30 are coupled to the receiving section 12. The plunger 20 has a projection 22, to which a compressive spring 24 is coupled. The spring 24 is supported, at the other end, by the valve seat 30.

The projection 22 of the plunger 20 supported by the compressive spring 24 is coupled to one end of a valve seat 30. The valve seat 30 has a hole 36 for being engaged into and separated from the projection 22, and a coupling channel 32 connected to the hole 36. The coupling channel 32 is also connected to a channel pipe 41 of an orifice 40.

The channel pipe 41 is reduced in diameter adjacent to a flow path 42 and then enlarged in diameter as approaching the hole 36. The coupling channel 32 is tapered in the inner periphery near a portion connected to the hole 36 to obtain smooth fluid flow.

In the meantime, the valve seat 30 has three isometric channel grooves 34 in the outer periphery. Alternatively, the valve seat 30 may have two symmetric channel grooves.

The channel grooves 34 can be formed into any shape such as circle, quadrangle, ellipse, V and U. The channel grooves 34 are preferably formed in plurality and very shallowly in the outer periphery of the valve seat 30.

A discharge channel 46 is provided in one side of the orifice 40, which has the second discharge port and communicates with a discharge port 44 of the housing 10.

A ball 50 is coupled to a blocking portion 48 where the discharge channel 46 communicates with the discharge port 44 of the housing 10.

The operation and embodiment of the ABS solenoid valve of the invention having the above construction will be described in reference to the drawings as follows.

FIG. 3 is a side cross-sectional view of the ABS solenoid valve of the invention.

First, when the plunger 20 is separated from the valve seat 30, oil from the master cylinder is introduced into a suction port, cleared of foreign materials in a filter, and then flows past the coupling channel 32 and the hole 36 of the valve seat 30 via the flow path 42 and the channel pipe 41 of the orifice 40.

The projection 22 of the plunger 20 is engaged into and separated from the hole of the valve seat 30 so that oil is introduced into the discharge port 44 via the channel groove 34 in the outer periphery of the valve seat 30.

As set forth above, the plunger 20 is separated from the valve seat 30 via the compressive spring 34 which is coupled with the projection 22 of the plunger 20 received within the housing and coupled with the valve seat 30 in a supporting manner. When a coil is energized, a shaft having a magnetic body pushes the plunger 20 so that the projection 22 of the plunger 20 is closely contacted with the hole 36 of the valve seat 30. In de-energization of the coil, the plunger 20 is separated by the compressive spring 24. Through the above reciprocating motion of the plunger 20, the pressure of brake oil is adjusted.

In the meantime, the discharge port 44 rapidly discharges oil via the discharge channel 46 provided in the side of the orifice 40 and communicating with the discharge port 44, which is formed in a coupling portion of the housing 10 and the second housing 40 and the end of the housing 10.

The ball 50 in the blocking portion 48 of the discharge channel 46 serves as a check valve for discharging the remaining quantity of oil via the discharge channel 46 together with oil discharged via the discharge port 44.

This can lower the high pressure within the housing 10 thereby prolonging life time of the system while enhancing the braking power in operation of the braking system.

That is, when oil is introduced by a large quantity, the pressure thereof is maximized. This precludes the anti-skid system from performing its function suitably.

Accordingly, the quantity of introduced oil is regulated proportional to the quantity of discharged oil to adjust the pressure of brake oil thereby enhancing the braking power.

According to the ABS solenoid valve of the present invention as set forth above, the following effects can be expected.

First, the channel grooves are disposed in the outer periphery of the valve seat to simplify a complicated fabricating process of the related art thereby reducing the material cost and the manufacturing time thereof.

Second, the channel pipe in the orifice is so formed to gradually enlarge in diameter from the flow path side toward the hole side of the valve seat so that smooth flow of brake oil prevents any hydraulic ram thereby enhancing the braking power.

Third, the discharge port for discharging brake oil, which is introduced from the master cylinder into the flow path of the orifice, into the wheel cylinder via the channel groove past the hole of vale seat and channel pipe is formed into two type to allow rapid discharge of oil thereby reducing the pressure within the housing.

Fourth, the ball is coupled with the blocking portion of the orifice discharge channel to adjust the quantity of oil discharged into the wheel cylinder. That is, oil is discharged via the discharge port as well as via the ball in an introducing portion into the channel pipe according to the pressure of introduced oil so as to adjust the pressure within the housing, thereby showing excellent effect in the braking power.

Although simplified in structure as set forth above, the ABS solenoid valve of the invention is an improved technology having the braking power over the related art to remarkably simplify a fabricating process so that the ABS solenoid valve can be downsized and light-weighted.

What is claimed is:

1. An ABS solenoid valve comprising:

a housing coupled within a modulator block;

a receiving unit disposed within the housing;

a plunger mounted on the receiving unit and having a projection in one end;

a compressive spring coupled with the plunger adjacent to the projection;

a valve seat supported by the compressive spring and received within the housing;

a coupling channel disposed within the valve seat;

an orifice communicating with the coupling channel of the valve seat and coupling with a side of the housing;

a flow path disposed within the orifice;

a channel pipe communicating with the flow path, a flow groove disposed in an outer periphery of the valve seat; and a discharge port disposed in the housing and the orifice and communicating with the flow groove of the valve seat.

2. The ABS solenoid valve in accordance with claim 1, wherein the channel pipe is reduced in diameter at a coupling portion adjacent to the orifice flow path and gradually enlarged in diameter toward the hole of the valve seat.

3. The ABS solenoid valve in accordance with claim 1, further comprising:

a discharge channel disposed in the orifice and communicating with the discharge port; and a ball coupled to a blocking portion of the discharge channel.

4. The ABS solenoid valve in accordance with claim 1, wherein the discharge port is disposed in a coupling end of the orifice and the housing communicating with the channel groove of the valve seat.

5. The ABS solenoid valve in accordance with claim 2, further comprising:

a discharge channel disposed in the orifice and communicating with the discharge port; and a ball coupled to a blocking portion of the discharge channel.

6. The ABS solenoid valve in accordance with claim 2, wherein the discharge port is disposed in a coupling end of the orifice and the housing communicating with the channel groove of the valve seat.

* * * * *